(12) United States Patent
Allen et al.

(10) Patent No.: US 6,345,353 B2
(45) Date of Patent: Feb. 5, 2002

(54) STACK POINTER WITH POST INCREMENT/ DECREMENT ALLOWING SELECTION FROM PARALLEL READ/WRITE ADDRESS OUTPUTS

(75) Inventors: Stephen Allen, Chandler; Igor Wojewoda, Phoenix, both of AZ (US)

(73) Assignee: Microchip Technology Incorporated, Chandler, AZ (US)

( * ) Notice: Subject to any disclaimer, the term of this patent is extended or adjusted under 35 U.S.C. 154(b) by 0 days.

(21) Appl. No.: 09/772,653

(22) Filed: Jan. 30, 2001

Related U.S. Application Data

(63) Continuation of application No. 09/356,720, filed on Jul. 20, 1999.

(51) Int. Cl.[7] .................................................. G06F 9/32
(52) U.S. Cl. ........................ 712/202; 711/219; 712/245
(58) Field of Search .......................... 711/219; 712/233, 712/245, 202

(56) References Cited

U.S. PATENT DOCUMENTS

| | | | | |
|---|---|---|---|---|
| 4,430,711 A | * | 2/1984 | Anderson et al. ........... 711/215 |
| 4,459,659 A | * | 7/1984 | Kim ........................... 709/100 |
| 4,835,738 A | * | 5/1989 | Niehaus et al. .............. 711/154 |
| 5,023,828 A | * | 6/1991 | Grundmann et al. ......... 712/245 |
| 5,193,205 A | * | 3/1993 | Matsuo et al. .............. 712/239 |
| 5,287,309 A | * | 2/1994 | Kai ........................ 365/189.04 |

* cited by examiner

Primary Examiner—Kenneth S. Kim
(74) Attorney, Agent, or Firm—Baker Botts L.L.P.

(57) ABSTRACT

The stack pointer is used for generating the next unutilized location in the stack memory device in order to indicate where a current value in the program counter is to be written. The stack pointer also generates a directly preceding location to the next unutilized location in order to read the last value of the program counter that was written to the stack memory device. The stack pointer will select the next unutilized location in the stack memory device for a write operation and the directly preceding location to the next unutilized location in the stack memory device for a read operation. The stack pointer will further perform either a post increment or post decrement operation on the next unutilized location in the stack memory device after execution of a current instruction.

8 Claims, 1 Drawing Sheet

STACK POINTER WITH POST INCREMENT/ DECREMENT ALLOWING SELECTION FROM PARALLEL READ/WRITE ADDRESS OUTPUTS

This application is a continuation of Ser. No. 09/356,720 filed Jul. 20, 1999.

BACKGROUND OF THE INVENTION

1. Field of the Invention

This invention relates generally to pointers and, more specifically, to a stack pointer which selects between the next available location in the stack memory and a pre-decremented location in the stack memory and which performs, either a post increment operation or post decrement operation after execution of a current instruction and a method therefor.

2. Description of the Prior Art

A "call" instruction and a "return" instruction are two instructions that work together to allow subroutines to be execute in a processor system. The "call" instruction and the "return" instruction work together to allow the called subroutine to automatically return back to the instruction that called it. This allows for the multiple nesting of subroutines.

During read and write operations to the top of the stack memory, the top of the stack will appear as a set of ordinary Random Access Memory (RAM) locations. In an instruction cycle that has four phases, it is necessary to read the top of the stack memory during the second phase of the instruction cycle and to write to the top of the stack memory during the fourth phase. It is desirable for reads and writes to the top of the stack to operate on the last value written, rather than on a blank location in the stack memory. This requires that the stack pointer be decremented at the very beginning of the second phase so that the last location in the stack memory where data was written may be read.

This creates a timing conflict. A "call" instruction requires that the stack pointer be pointing to the next available location in the stack memory during the second phase of a write operation. However, the stack pointer also needs to be pointing to the directly preceding location during the second phase for a read during a top of stack operation.

Therefore, a need existed to provide an improved stack pointer. The improved stack pointer must be able to pre-decode a decremented value, and to have this value selectable by a multiplexer in order to read this location. The improved stack pointer must further be able to pre-decode a decremented value and to have post increment/decrement options.

SUMMARY OF THE INVENTION

In accordance with one embodiment of the present invention, it is an object of the present invention to provide an improved stack pointer.

It is another object of the present invention to provide an improved stack pointer that is able to pre-decode a decremented value of a stack memory.

It is further object of the present invention to provide an improved stack pointer that is able to pre-decode a decremented value of a stack memory, and to have this value selectable by a multiplexer in order to read the last location in the stack memory where data was written.

It is still another object of the present invention to provide an improved stack pointer that is able to pre-decode a decremented value and to have post increment/decrement options.

BRIEF DESCRIPTION OF THE PREFERRED EMBODIMENTS

In accordance with one embodiment of the present invention, a pre-decode stack pointer system with post revise operation is disclosed. The stack pointer system has a stack memory device which when used in conjunction with a stack pointer 1F stores and retrieves values of a program counter on a first in last out (FILO) basis. The stack pointer is coupled to the stack memory device. The stack pointer is used for generating the next unutilized location in the stack memory device in order to indicate where a current value in the program counter is to be written. The stack pointer also generates a directly preceding location to the next unutilized location in order to read the last value of the program counter that was written to the stack memory device. The stack pointer will select the next unutilized location in the stack memory device for a write operation and the directly preceding location to the next unutilized location in the stack memory device for a read operation. The stack pointer will further perform either a post increment or post decrement operation on the next unutilized location in the stack memory device after execution of a current instruction.

In accordance with another embodiment of the present invention, a method of providing a pre-decode stack pointer system with post revise operation comprising the steps of: providing a stack memory device which stores and retrieves values of a program counter; and providing a stack pointer coupled to the stack memory device for generating the next unutilized location in the stack memory device to indicate where a current value of the program counter is to be written, for generating a directly preceding location to the next unutilized location to read a last value of the program counter written to the stack memory device, for selecting one of the next unutilized location in the stack memory device or the directly preceding location to the next unultilized location in the stack memory device, and for one of post incrementing or post decrementing the next unutilized location in the stack memory device after execution of a current instruction.

The foregoing and other objects, features, and advantages of the invention will be apparent from the following, more particular, description of the preferred embodiments of the invention, as illustrated in the accompanying drawings.

DETAILED DESCRIPTION OF THE PREFERRED EMBODIMENT

Figure 1:
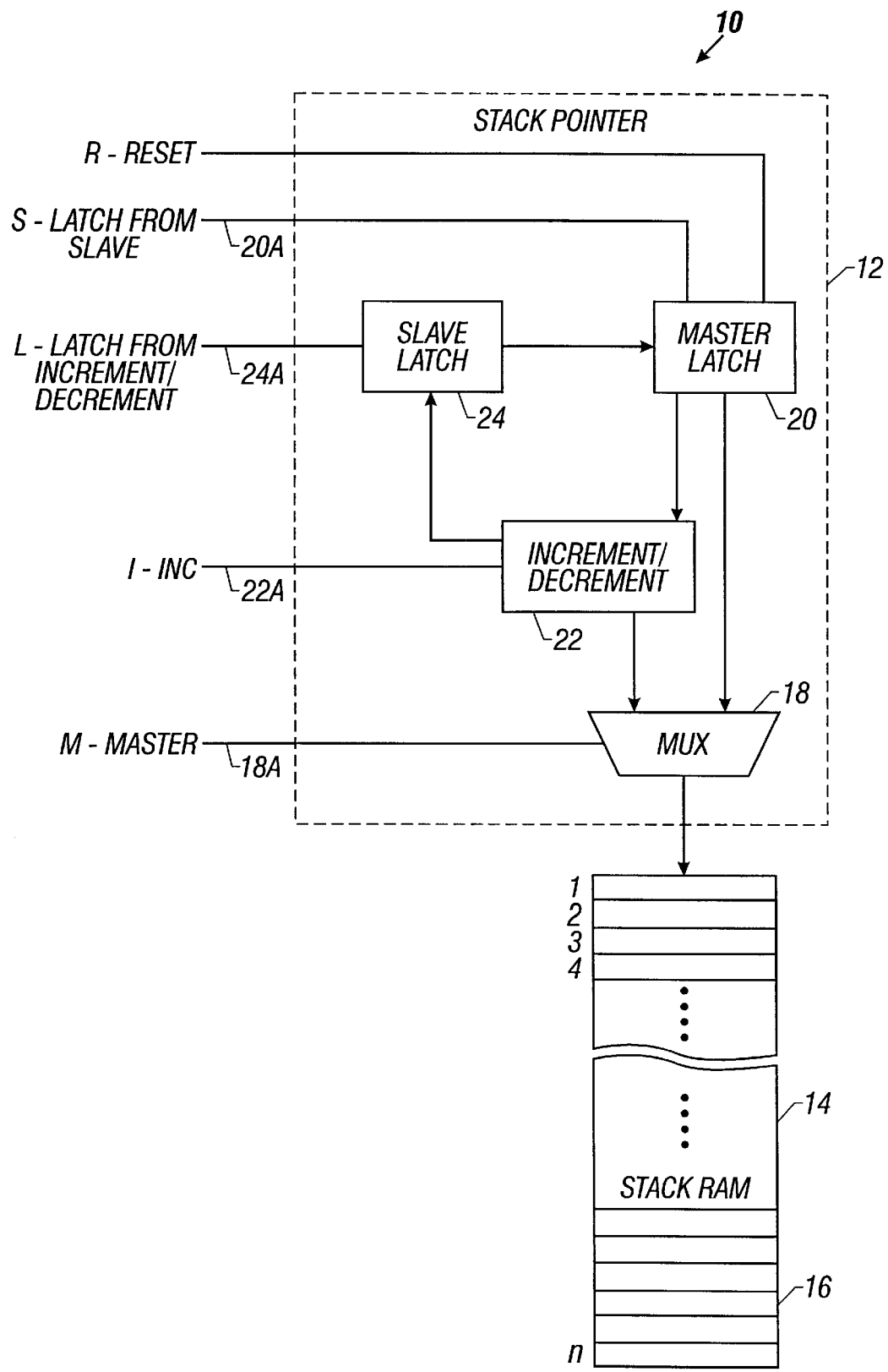
FIG. 1 shows a simplified functional block diagram of the pre-decoded stack pointer of the present invention which has post increment/decrement options.

Referring to FIG. 1, a stack pointer system 10 (hereinafter system 10) is shown. The system 10 is comprised of a stack pointer 12 and a stack memory 14. Generally speaking, a stack pointer 12 is a device which is used to point to different locations 16 in the stack memory 14. The stack memory 14 is a structure which is used to store and retrieve values of the program counter (not shown). A program counter being a register which contains the address location of the current instruction to be cis executed.

The system 10 is extremely helpful in the execution of "call" and "return" instructions. An instruction cycle in a PIC microcontroller is organized into four phase cycles (q1, q2, q3, and q4). In a typical instruction cycle, the instruction from the program counter is decoded during the first phase cycle q1, the RAM or special function register is read during the second phase cycle q2, the operation of the instruction is performed during the third phase cycle q3, and the result of the operation is written during the fourth phase cycle q4. All instructions that modify the program counter have an extra instruction cycle after the instruction is executed during which a forced no operation (NOP) occurs. This is required to flush out the pipeline in order to discard a pre-fetched instruction that should not be executed by the processor.

During a "call" instruction, the value of the program counter is written to the stack memory 14 during the second phase cycle q2. Because the instruction is decoded during first phase cycle q1, there is no time to do any modifications to the value of the stack pointer 10 before the write is to be performed. This necessitates having the stack pointer 12 point to the next available stack location 16 which is unutilized.

During a "return" instruction, the value that was last pushed onto the stack memory 14 is retrieved, and is returned to the program counter during the fourth cycle q4. This necessitates that the stack pointer 12 be decremented between the beginning of the second phase cycle q2 and the beginning of the fourth phase cycle q4, so that the last value put in the stack memory 14 can be retrieved. This presents a timing issue because it takes three phase cycles to decrement the stack pointer 12 (i.e., three phases cycles to decrement the value and latch the new value into the master latch 20 with a cycle for settling). Furthermore, care must be exercised during the second phase cycle q2, so that no glitches will occur in the stack pointer 12 which could cause a corruption of the stack memory 14 during a write operation.

Thus, during read and write operations to the top of the stack memory 14, the top of the stack memory 14 will appear as a set of ordinary Random Access Memory (RAM) locations. In an instruction cycle that has four phases, it is necessary to read the top of the stack memory 14 during the second phase cycle q2 of the instruction cycle and to write to the top of the stack memory 14 during the fourth phase cycle q4. It is desirable for reads and writes to the top of the stack memory 14 to operate on the last value written, rather than on a blank location in the stack memory 14. This requires that the stack pointer 12 be decremented at the very beginning of the second phase cycle q2 so that the last location in the stack memory 14 where data was written may be read.

This creates a timing conflict. A "call" instruction requires that the stack pointer 12 point to the next available location in the stack memory 14 during the second phase cycle q2 of the write operation. However, the stack pointer 12 also needs to point to the directly preceding location during the second phase cycle q2 for a read during a top of stack operation.

The system 10 of the present invention solves the aforementioned timing problems by pre-decoding the decremented value and providing post increment and decrement options. The stack pointer 12 has a selection circuit 18 coupled to the stack memory 14. The selection circuit 18 is used for selecting and outputting either the next unutilized location in the stack memory 14 for a write operation or the directly preceding location to the next unutilized address location (pre-decremented value)in the stack memory 14 for a read operation. In the embodiment depicted in FIG. 1, a multiplexer is used as the selection circuit 18.

A master latch 20 is coupled to the selection circuit 18. The master latch 20 is used for storing the next unutilized location in the stack memory 14 where data is to be written.

An increment/decrement circuit 22 is coupled to the selection circuit 18 and to the master latch 20. The increment/decrement circuit 22 is used for pre-decrementing the next unutilized location in the stack memory device 14. This generates the directly preceding location to the next unutilized location in the stack memory 14 which is basically the last location in the stack memory 14 where data was written. This allows for a read operation to read the data of the last value of the program counter written to the stack memory 14. The increment/decrement circuit 22 also allows for either post incrementing or post decrementing the next unutilized location in the stack memory 14 after execution of the current instruction. By post incrementing, the stack pointer 12 will generate the next available unutilized location in the stack memory 14 where the next value of the program counter is to be written. By post decrementing the next unutilized location in the stack memory 14 after execution of the current instruction, the data pointer 12 can generate the last location in the stack memory 14 where data was written.

Thus, the pointer system 10 provides a problem free way of decrementing the stack pointer 12 for a "return" instruction since the decremented value is already available. Because both the "call" and "return" instructions change the value of the program counter, they are two-cycle instructions. If a "call" or "return" instruction is executed, this leaves the second cycle of both instructions, four phase cycles, for a true increment/decrement operation on the stack pointer 12. Using these four phase clocks, the pre-decoded value can be latched into a slave latch 24 at any time prior to updating the master latch 20.

OPERATION

Referring now to FIG. 1, the operation of the system 10 will be disclosed. The master latch 20 contains the current stack pointer 12 value (i.e., next available stack pointer location needs to be available in case of a write operation to the top of the stack memory 14). The increment/decrement circuit 22 is coupled to a signal line 22A. The signal line 22A tells the increment/decrement circuit 22 whether to increment or decrement the value in the master latch 20. In the preferred embodiment of the present invention, the default value of the signal line 22 keeps the increment/decrement circuit 22 in a decrement state. The selection circuit 18 has a signal line 18A which tells the selection circuit 18 whether to output the next unutilized location in the stack memory 14 or the directly preceding location in the stack memory 14. By default, the signal line 18A outputs the next available location in the stack memory 14 where data is to be, written. In case of a top of stack operation, and a read is required, the signal line 18A will change to output the value from the increment/decrement circuit 22 which is generally the last location in the stack memory 14,where data was written.

The slave latch 24 is used to update the master latch 20 and to ensure that the value is not corrupted. The slave latch 24 is coupled to a latch signal 24A. The latch signal 24A is a signal which will update and latch in the new value from the increment/decrement circuit 22 into the slave latch 24. The master latch 20 is also coupled to a-signal line 20 which will update and latch in the new value from the slave latch 24 into the master latch 20.

While the invention has been particularly shown and described with reference to preferred embodiments thereof, it will be understood by those skilled in the art that the foregoing and other changes in form, and details may be made therein without departing from the spirit and scope of the invention.

What is claimed is:

1. A pre-decode stack pointer system with post revise operation comprising, in combination:

a stack memory device which stores and retrieves values of a program counter;

a stack pointer register having an input and an output for storing next unutilized location in said stack memory device to indicate where a current value of said program counter is to be written;

an incrementer/decrementer unit for generating a directly preceding location to said next unutilized location to read a last value of said program counter written to said stack memory device and for generating either said directly preceding location or a directly following location for updating said stack point register wherein said incrementer/decrementer unit is coupled with said input and said output of said stack pointer register; and a select unit for selecting one of said next unutilized location in said stack memory device or said directly preceding location to said next unutilized location in said stack memory device.

2. A pre-decode pointer system with post revise operation in accordance with claim 1, further comprising a slave latch circuit coupled to said stack pointer register and to said increment decrement unit for storing and sending to said stack pointer register one of said next available unutilized location in said stack memory device where a next value of said program counter is to be written or said directly preceding location to said unutilized location to read data from said last value of said program counter written to said stack memory device.

3. A pre-decode pointer system with post revise operation in accordance with claim 1 wherein said selection means is a multiplexer circuit.

4. A method of providing a pre-decode stack pointer system comprising the steps of:

providing a program counter;

providing a stack memory device which stores and retrieves values of said program counter;

providing a register for storing a first stack memory address to indicate where a current value of said program counter is to be written;

providing an incrementer/decrementer unit for generating a second stack memory address to indicate a program counter value previously written to said stack memory device;

providing said first and second stack memory address in parallel;

selecting one of said stack memory addresses depending on a read or a write operation to said stack memory device;

generating an update value by said incrementer/decrementer unit which is either said second stack memory address or a third stack memory address indicating a value following said program counter value; and updating said register with said incrementer/decrementer unit.

5. Method according to claim 4, wherein the step of updating comprises the steps of:

latching a third stack memory address generated by said incrementer/decrementer unit upon a write operation; and updating said first stack memory address with said third stack memory address.

6. Method according to claim 4, further comprising the steps of:

updating said first stack memory address with said second stack memory address after a read operation.

7. Method according to claim 5, wherein said write operation is initiated by a call to a sub-routine instruction.

8. Method according to claim 6, wherein said read operation is initiated by a return from a sub-routine instruction.

* * * * *